(12) United States Patent
Maucher et al.

(10) Patent No.: US 7,846,059 B2
(45) Date of Patent: Dec. 7, 2010

(54) AUTOMATIC TRANSMISSION WITH DRY CLUTCHES, MULTI-PURPOSE ACTUATORS, OR DAMPER

(75) Inventors: Edmund Maucher, Jeromesville, OH (US); Jeffrey Hemphill, Copley, OH (US)

(73) Assignee: Schaeffler Technologies GmbH & Co. KG, 91074 Herzogenaurach (DE)

( * ) Notice: Subject to any disclaimer, the term of this patent is extended or adjusted under 35 U.S.C. 154(b) by 458 days.

(21) Appl. No.: 11/715,792

(22) Filed: Mar. 8, 2007

(65) Prior Publication Data

US 2008/0220927 A1    Sep. 11, 2008

(51) Int. Cl.
*F16H 3/44* (2006.01)
(52) U.S. Cl. ....................................... 475/296; 475/284
(58) Field of Classification Search ................. 475/159, 475/275, 284, 296
See application file for complete search history.

(56) References Cited

U.S. PATENT DOCUMENTS

| | | | |
|---|---|---|---|
| 2,671,359 A * | 3/1954 | Scheiter | 475/59 |
| 5,106,352 A | 4/1992 | Lepelletier | |
| 6,176,802 B1 | 1/2001 | Kasuya et al. | |
| 6,699,153 B2 | 3/2004 | Biallas | |
| 7,114,585 B2 * | 10/2006 | Man et al. | 180/65.21 |
| 7,364,523 B2 * | 4/2008 | Heitmann et al. | 475/5 |
| 7,367,416 B2 * | 5/2008 | Seufert et al. | 180/65.31 |
| 7,458,650 B2 * | 12/2008 | Toyota et al. | 303/151 |
| 7,485,066 B2 * | 2/2009 | Bailey et al. | 475/269 |
| 2005/0137045 A1 | 6/2005 | Stevenson | |

* cited by examiner

*Primary Examiner*—Ha D. Ho
(74) *Attorney, Agent, or Firm*—Simpson & Simpson, PLLC

(57) ABSTRACT

An automatic transmission including a first number of dry clutches; a second number of brakes; a third number of actuators; and transfer elements. The transfer elements are connected to respective clutches and brakes by respective uninterruptible mechanical paths. The actuators are arranged to displace respective transfer elements to operate the dry clutches and brakes. The third number is less than a sum of the first and second numbers. The transmission can include an input to a drive unit; a gear set; a damper connecting the drive unit and gear set; and an uninterrupted torque path between the drive unit and gear set. The transmission can include: a fluid chamber; dry portions; a six speed gear set at least partly in the chamber; three shafts at least partially disposed in the chamber; and three sealing elements forming a fluid-tight seal among the shafts, chamber, and dry portions.

21 Claims, 5 Drawing Sheets

AUTOMATIC TRANSMISSION WITH DRY CLUTCHES, MULTI-PURPOSE ACTUATORS, OR DAMPER

FIELD OF THE INVENTION

The invention relates to improvements in vehicular transmissions. In particular, the invention relates to a transmission with dry clutches and brakes and electric actuators directly operating more than one clutch or brake. The invention also relates to a transmission with a damper between an input and a gear set in the transmission and a reduced number of output shafts and seals.

BACKGROUND OF THE INVENTION

Electric actuators are used in transmissions to operate dry clutches and brakes. Unfortunately, actuators increase the cost and complexity of a transmission. Torque carrying members in a transmission with dry clutches and brakes may pass between fluid-containing regions of a transmission and dry regions of a transmission. The cost and complexity of the transmission can be decreased and the functionality enhanced by decreasing the number of seals needed for the transition of the members between the regions. A transmission with dry clutches and brakes requires a certain number of torque carrying members. The cost and complexity of the transmission can be decreased and the functionality enhanced, by reducing the number of such members.

Thus, there is a long-felt need for an automatic transmission with dry clutches and having a reduced number of actuators, seals, and torque transmitting members.

BRIEF SUMMARY OF THE INVENTION

The present invention broadly comprises an automatic transmission including: a plurality of dry clutches including a first number of the clutches; a plurality of brakes including a second number of the brakes; a plurality of actuators; and a plurality of transfer elements. The transfer elements are connected to respective clutches and brakes by respective uninterruptible mechanical paths. The plurality of actuators are arranged to displace respective transfer elements from the plurality of transfer elements to operate the respective pluralities of dry clutches and brakes. The plurality of actuators includes a third number of actuators, and the third number is less than a sum of the first and second numbers.

In some aspects, the plurality of dry clutches includes three clutches, the plurality of brakes includes two brakes, and the plurality of actuators includes three actuators. In some aspects, a first actuator from the plurality of actuators is arranged to operate a first clutch from the plurality of clutches and a first brake from the plurality of brakes; and a second actuator from the plurality of actuators operates a second clutch from the plurality of clutches and a second brake from the plurality of brakes. In some aspects, the first actuator is arranged to open one of the first clutch and the first brake and close the other of the first clutch and the first brake without overlapping in time the opening and closing. In some aspects, the second actuator is arranged to sequentially engage and disengage the second clutch and the second brake and wherein the engagement and disengagement overlap in time to provide a continuous torque transfer.

In some aspects, the automatic transmission includes an input arranged for direct connection to a drive unit; a gear set; a damper rotationally connecting the drive unit and the gear set; and an uninterrupted torque path between the drive unit and the gear set. In some aspects, the gear set includes a planetary gear set with a ring gear and the damper is connected to the ring gear. In some aspects, the automatic transmission includes: a chamber containing fluid; at least one portion substantially free of fluid; a gear set with at least six speeds and at least partially disposed in the chamber; three torque transmitting members at least partially disposed in the chamber; and three sealing elements disposed among the torque transmitting members and forming a fluid-tight seal among the torque transmitting members, the chamber, and the at least one portion. The plurality of torque transmitting members is arranged to transfer torque for the at least six speeds in the gear set.

The present invention also broadly comprises an automatic transmission, including: an input arranged for direct connection to a drive unit; a gear set; a damper rotationally connecting the drive unit and the gear set; and an uninterrupted torque path between the drive unit and the gear set. In some aspects, the gear set includes a planetary gear set with a ring gear and the damper is connected to the ring gear. In some aspects, the automatic transmission includes: a plurality of dry clutches including a first number of clutches; a plurality of brakes including a second number of brakes; a plurality of actuators; and a plurality of transfer elements. The transfer elements are connected to respective clutches and brakes by respective uninterruptible mechanical paths. The plurality of actuators are arranged to displace respective transfer elements from the plurality of transfer elements to operate the respective pluralities of dry clutches and brakes. The plurality of actuators includes a third number of actuators, and the third number is less than a sum of the first and second numbers. In some aspects, the plurality of dry clutches includes three clutches, the plurality of brakes includes two brakes, and the plurality of actuators includes three actuators.

In some aspects, the automatic transmission includes: a chamber containing fluid; at least one portion substantially free of fluid; a gear set with at least six speeds and at least partially disposed in the at least one chamber; three torque transmitting members at least partially disposed in the chamber; and three sealing elements disposed among the torque transmitting members and forming a fluid-tight seal among the torque transmitting members, the chamber, and the at least one portion. The plurality of torque transmitting members is arranged to transfer torque for said six speeds in the gear set.

The present invention further broadly comprises an automatic transmission, including: a one chamber containing fluid; at least one portion substantially free of fluid; a gear set with at least six speeds and at least partially disposed in the at least one chamber; a plurality of torque transmitting members at least partially disposed in the chamber; and three sealing elements disposed among the torque transmitting members and forming a fluid-tight seal among the torque transmitting members, the chamber, and the at least one portion. The plurality of torque transmitting members is arranged to transfer torque for the at least six speeds in the gear set. In some aspects, the plurality of torque transmitting members includes three concentrically disposed shafts connected to the gear set.

In some aspects, the automatic transmission includes respective pluralities of dry clutches and brakes, and the at least one chamber includes first and second chambers. Then, the six speed gear set includes first and second planetary gear sets located in the first and second chambers, respectively, the at least one portion includes a third chamber axially disposed between the first and second chambers, and first and second portions disposed on either axial end of the transmission, respectively, and the respective pluralities of clutches and brakes are disposed in the at least one portion.

In some aspects, the automatic transmission includes: a plurality of dry clutches including a first number clutches; a plurality of brakes including a second number brakes; a plurality of actuators; and a plurality of transfer elements. The transfer elements are connected to respective clutches and brakes by respective uninterruptible mechanical paths. The plurality of actuators are arranged to displace respective transfer elements from the plurality of transfer elements to operate the respective pluralities of dry clutches and brakes. The plurality of actuators includes a third number of actuators, and the third number is less than a sum of the first and second numbers. In some aspects, the plurality of dry clutches includes three clutches, the plurality of brakes includes two brakes, and the plurality of actuators includes three actuators.

In some aspects, the automatic transmission includes an input arranged for direct connection to a drive unit; a gear set; a damper rotationally connecting the drive unit and the gear set; and an uninterrupted torque path between the drive unit and the gear set. In some aspects, the gear set includes a planetary gear set with a ring gear and the damper is connected to the ring gear.

The present invention broadly comprises an automatic transmission, including: a first number of dry clutches; a second number of brakes; a third number of electric actuators; a plurality of transfer elements; a gear set with at least six speeds and including a planetary gear set with a ring gear; an input arranged for direct connection to a drive unit; a damper rotationally connecting the drive unit and the ring gear; an uninterrupted torque path between the drive unit and the ring gear; a chamber containing fluid; at least one portion substantially free of fluid; three torque transmitting members at least partially disposed in the chamber; and three sealing elements disposed among the torque transmitting members and forming a fluid-tight seal among the torque transmitting members, the chamber, and the at least one portion. The transfer elements are connected to respective clutches and brakes by respective uninterruptible mechanical paths. The actuators are arranged to displace respective transfer elements to operate the dry clutches and brakes. The third number is less than a sum of the first and second numbers. The six speed gear set is at least partially disposed in the at least one chamber. The three torque transmitting members are arranged to transfer torque for said six speeds in the gear set.

It is a general object of the present invention to provide a transmission with dry clutches and brakes and one or more actuators operating multiple clutches or brakes.

It is another object of the present invention to provide a transmission with dampening between an input of the transmission and a gear set in the transmission.

It is a further object of the present invention to provide a six-speed transmission with gears in fluid-containing chambers, dry clutches and brakes in areas free of fluid, and a minimal number of seals between the chambers and areas.

It is a further object of the present invention to provide a six-speed transmission with gears in fluid-containing chambers, dry clutches and brakes in areas free of fluid, and a minimal number of torque transfer members.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
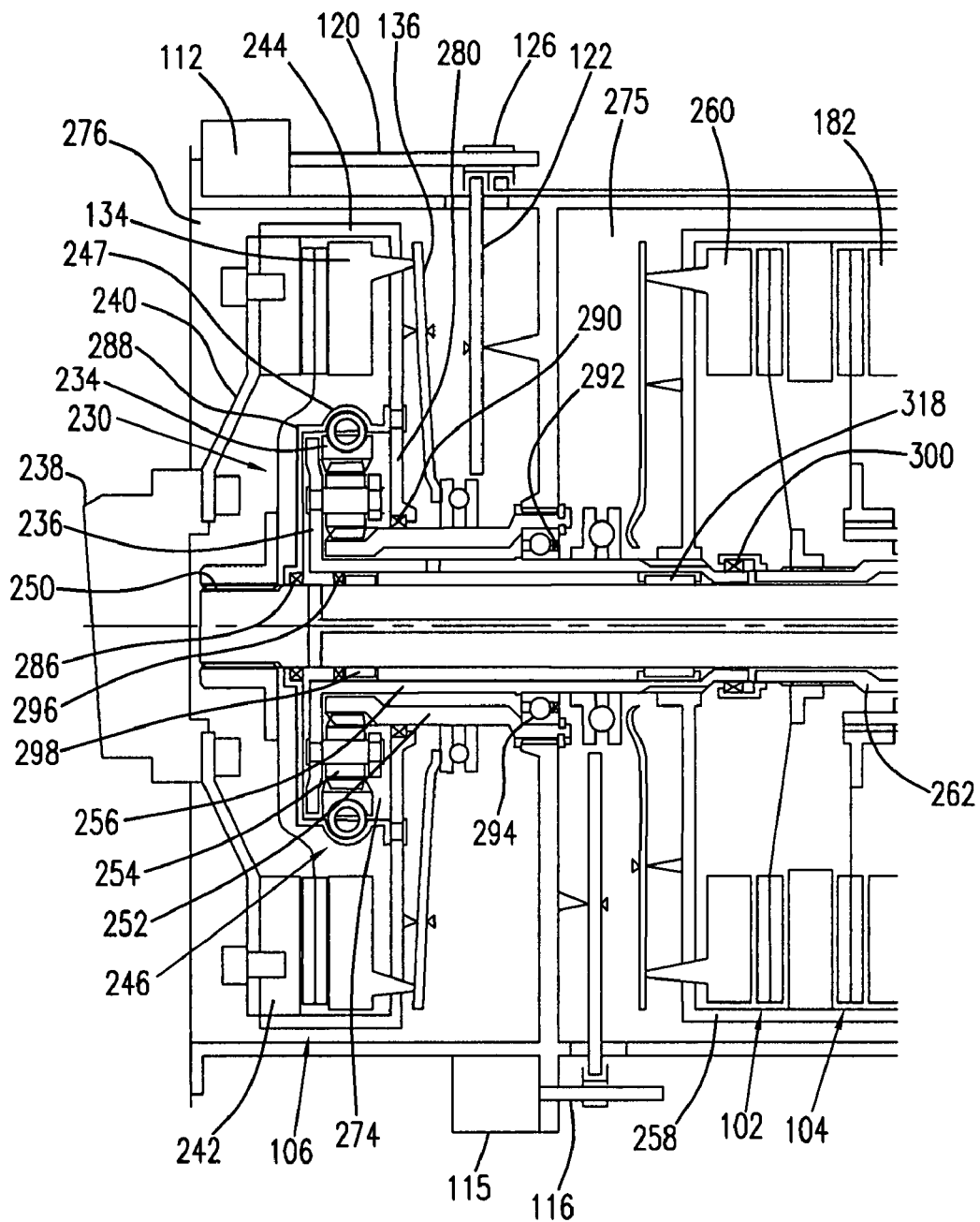
FIG. 1 is a partial cross-section view of a first portion of a present invention transmission.

FIG. 1 is a partial cross-section view of a first portion of present invention transmission 100.

Figure 2:
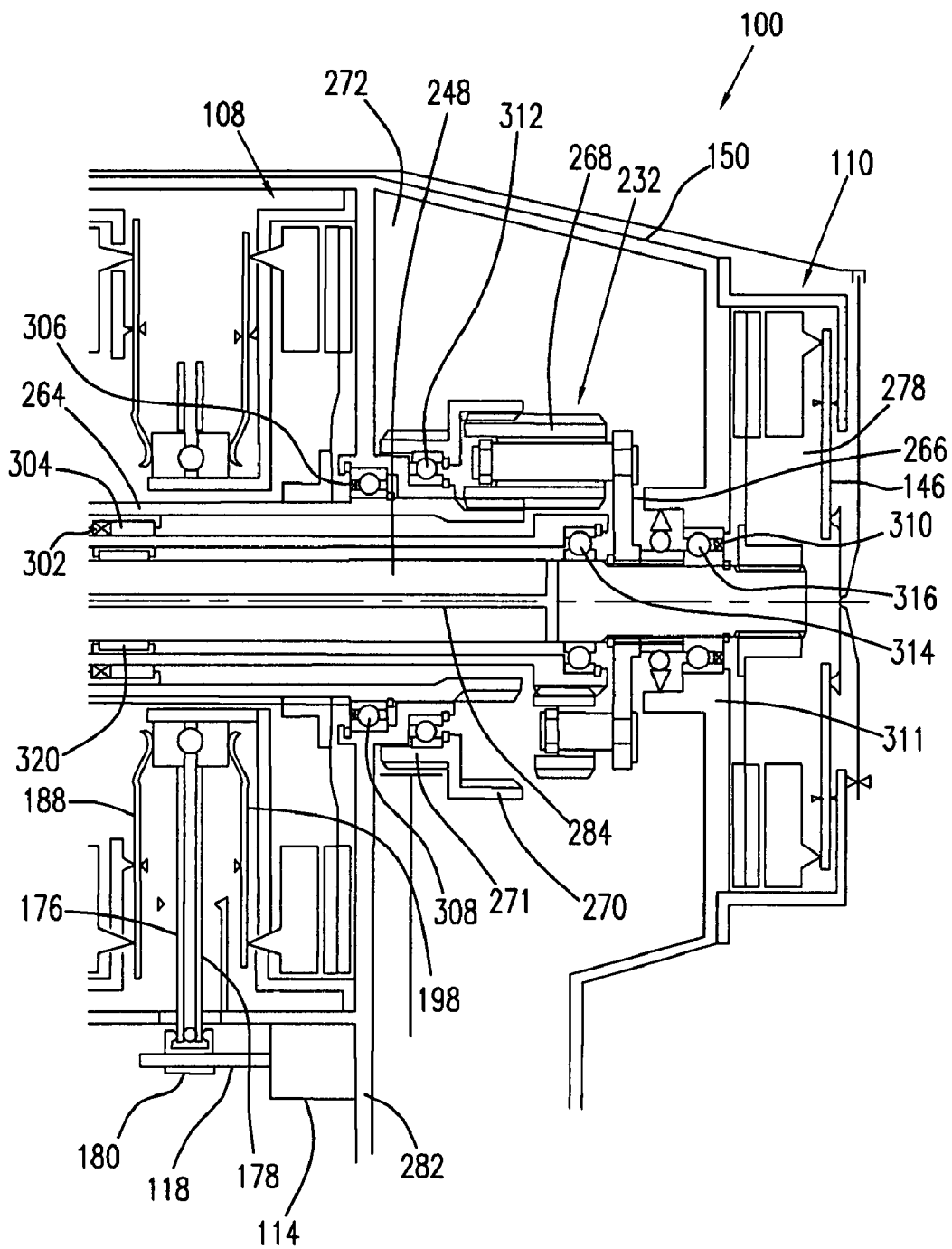
FIG. 2 is a partial cross-section view of a second portion of a present invention transmission.

FIG. 2 is a partial cross-section view of a second portion of present invention transmission 100.

Figure 3:
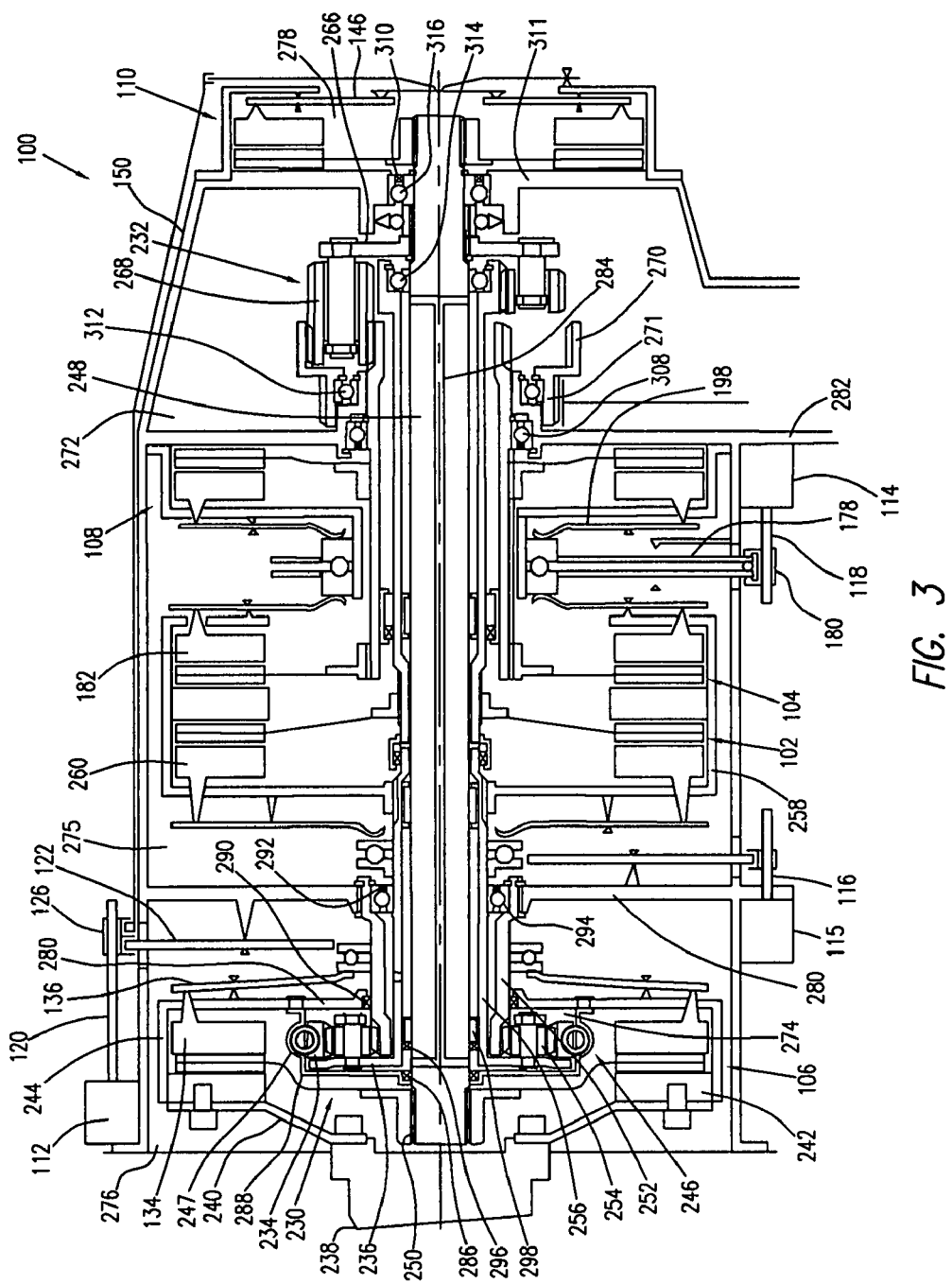
FIG. 3 is a cross-sectional view of the present invention transmission shown in FIGS. 1 and 2.

FIG. 3 is a cross-sectional view of present invention transmission 100 shown in FIGS. 1 and 2.

Figure 4:
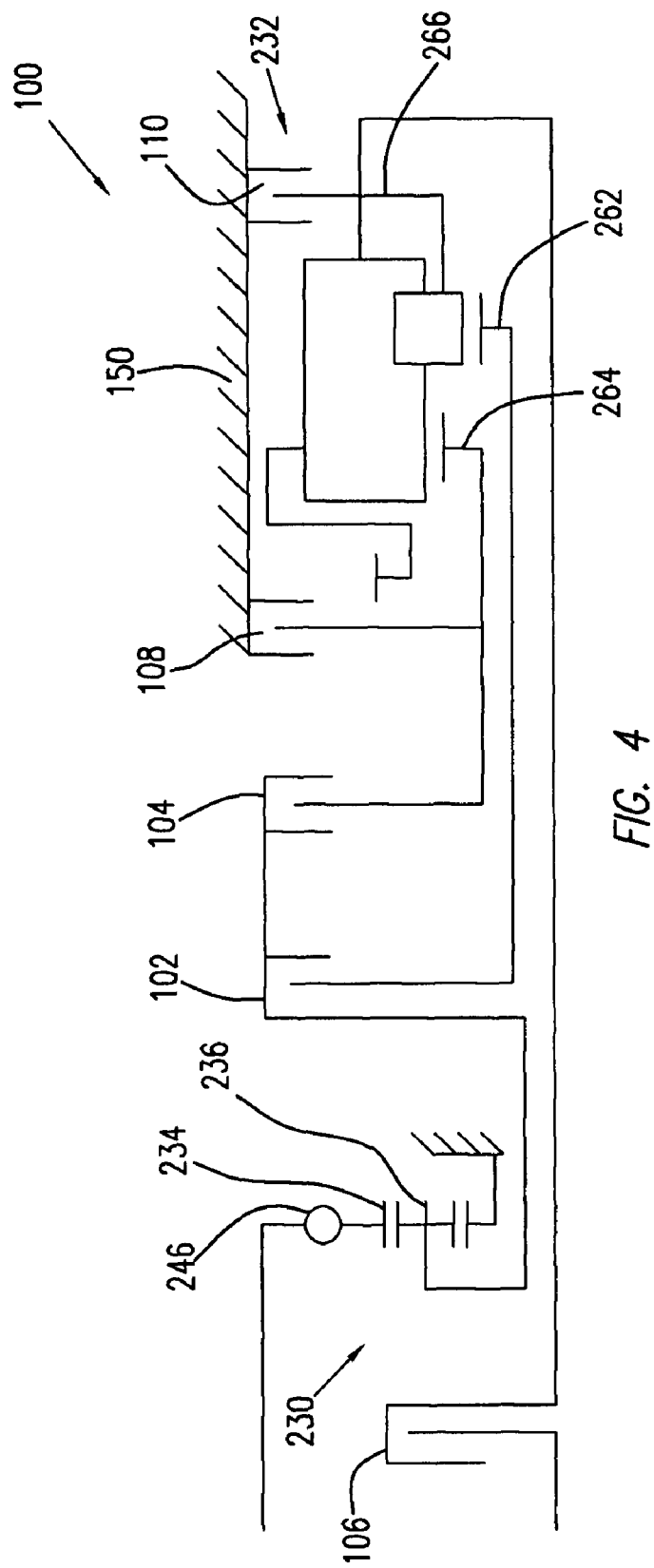
FIG. 4 is a diagrammatic representation of the transmission shown in FIG. 3.

FIG. 4 is a diagrammatic representation of transmission 100 shown in FIG. 3. The following should be viewed in light of FIGS. 1 through 4. A present invention transmission, for example, transmission 100, includes respective pluralities of dry clutches, brakes, and actuators. In some aspects, the total number of clutches and brakes is less than the number of actuators in the transmission. That is, at least one of the actuators operates a combination of two or more clutches or brakes. In some aspects, the transmission includes clutches 102, 104, and 106; brakes 108 and 110; actuators 112, 114, and 115; and transfer elements 116, 118, and 120. The actuators displace respective transfer elements to operate the clutches and brakes, as further described infra. Thus, there are three clutches and two brakes, but only three actuators. Actuators 112, 114, and 116 can be any type known in the art. In some aspects, the actuators are electric rotary actuators, hydraulic actuators, or vacuum actuators. The transfer elements can be any type of transfer element known in the art, for example, shafts.

In some aspects, the transfer elements are integral to the respective actuator. For example, transfer elements 116, 118, and 120 are integral, or part of, actuators 115, 114, and 112, respectively. In some aspects (not shown), the transfer elements are separate from the respective actuators and joined to the actuators by any means known in the art. In some aspects (not shown), overload devices or slip clutches are connected to one or more of the actuators and respective clutches. For example, a slip clutch can be connected to a shaft for an actuator on one side and to a transfer element on the other side. In some aspects, the transfer elements are shafts. In some aspects, the actuators are electric rotary actuators arranged to rotate an integral shaft. In the discussions that follow, electric rotary actuators with integral shafts for the transfer elements are shown, however it should be understood that a present invention transmission is not limited to electric rotary actuators with integral shafts.

The transfer elements are connected to respective clutches and brakes by respective uninterruptible mechanical paths. That is, there is a continuous, mechanical connection between the transfer elements and the respective clutches and brakes. For example, as further described infra, the transfer elements are connected to the clutches and brakes by threaded elements, pivots, and levers, all of which form an uninterrupted path between the transfer elements and the clutches and brakes. For example, the transfer elements are not connected to the clutches and brakes using clutches or other devices that can be disengaged.

Actuator 112 is arranged to operate clutch 106 and brake 110. Actuator 114 is arranged to operate clutch 104 and brake 108. Thus, actuators 112 and 114 each operate a clutch and a brake. Actuator 116 operates clutch 106. The operation of the clutches, brakes, and actuators with respect to the operation of the transmission is discussed infra.

Figure 5:
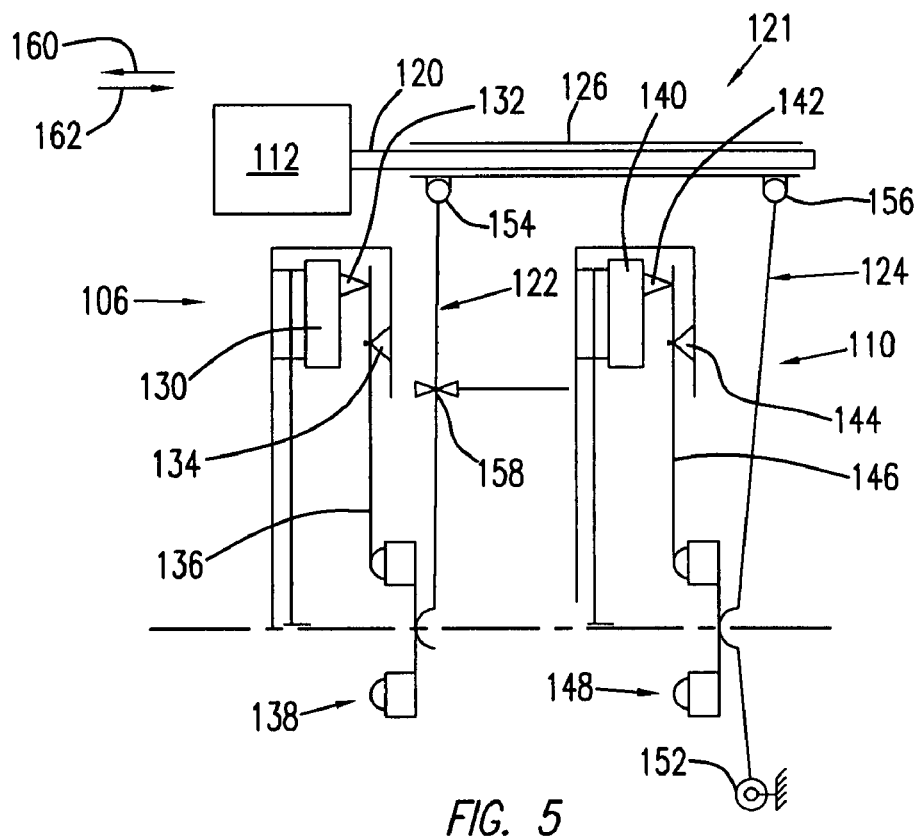
FIG. 5 is a schematic representation of a first exemplary embodiment of a present invention actuator assembly; and, FIG. 6 is a schematic representation of a second exemplary embodiment of a present invention actuator assembly.

FIG. 5 is a schematic representation of present invention actuator assembly 121. The following should be viewed in light of FIGS. 1 through 5. Actuator 112 rotates shaft 120 to displace release levers 122 and 124, to operate clutch 106 and brake 110, respectively. The levers can be of any type known in the art. Shaft 120 can displace the levers by any means known in the art. In some aspects, one or more threaded elements, such as nut 126, are used. Clutch 106 and brake 110 are of any type and configuration known in the art. In some aspects, clutch 106 includes pressure plate 130, cam 132, fulcrum 134, spring 136, and release bearing 138.

In some aspects, brake 110 includes pressure plate 140, cam 142, fulcrum 144, spring 146, release bearing 148, and pivot point 152. In some aspects, levers 122 and 124 are pivotably connected to nut 126, for example, by pivots 154 and 156 respectively. In some aspects clutch 106 also includes fulcrum 158 for lever 122. In some aspects, the clutch and brake are normally closed, and in the zero position, forces exerted by levers 122 and 124 on bearings 138 and 148, respectively, sufficiently counteract forces from springs 136 and 146 on bearing 138 and 148, respectively, so that the clutch and brake are disengaged.

The following is a description of the operation of assembly 121. In some aspects, there are three configurations for the clutch and brake with respect to the operation of transmission 100: 1) both disengaged; 2) the clutch engaged and the brake disengaged; and 3) the clutch disengaged and the brake engaged. In FIG. 5, assembly 121 is in the first configuration. To disengage the clutch and brake, bearings 138 and 148 are sufficiently displaced in direction 160 to open the clutch and brake, respectively. To move from the first to the second configuration, actuator 112 rotates shaft 120 in a first rotational direction, displacing nut 126 in direction 160. The movement of nut 126 in direction 160 causes lever 122 to pivot counterclockwise about fulcrum 158. The rotation of the lever enables spring 136 to displace bearing 138 in direction 162 and displace pressure plate 130 in direction 160, engaging clutch 106. At the same time, lever 124 pivots counterclockwise about point 152, further displacing bearing 148 in direction 160, and further opening brake 110.

To move from the first configuration to the third configuration, actuator 112 rotates shaft 120 in a second, opposite, rotational direction so that nut 126 moves in direction 162. Lever 122 displaces clockwise about fulcrum 158, which further displaces bearing 138 in direction 160 and further opens the clutch. At the same time, lever 124 displaces clockwise about pivot 152, which enables spring 146 to displace bearing 148 in direction 162 and pressure plate 140 in direction 160, engaging the brake. Thus, actuator 112 opens and closes clutch 106 and brake 110 separately, that is, there is little or no overlap in the opening and closing sequences. It should be understood that assembly 121 is not limited to a particular rotational direction for the first and second rotational directions noted above. For example, the first direction could be clockwise or counterclockwise with respect to an axis for the shaft. It also should be understood that assembly 121 is not limited to the configuration and components shown and that other configurations and components, which accomplish the operations described, are included in the spirit and scope of the claimed invention.

Figure 6:
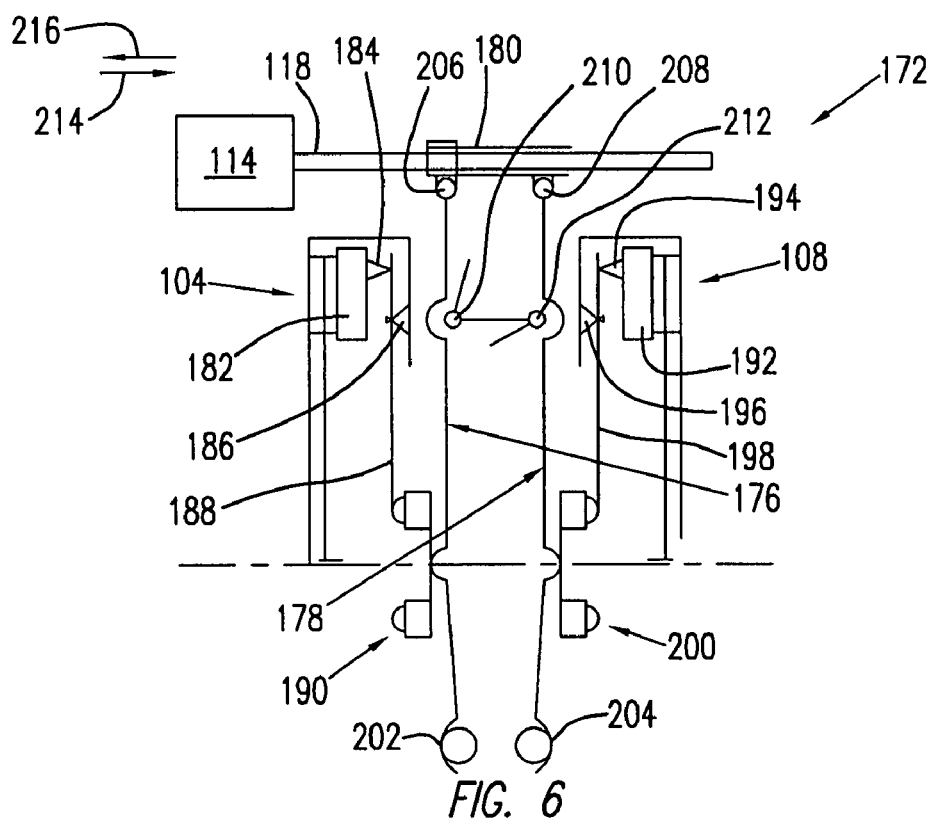

FIG. 6 is a schematic representation of present invention actuator assembly 172. The following should be viewed in light of FIGS. 1 through 6. Actuator 114 rotates shaft 118 to displace release levers 176 and 178, to operate clutch 104 and brake 108, respectively. The levers can be of any type known in the art. Shaft 118 can displace the levers by any means known in the art. In some aspects, a threaded element, such as nut 180, is used. Clutch 104 and brake 108 are of any type and configuration known in the art. In some aspects, clutch 104 includes pressure plate 182, cam 184, fulcrum 186, spring 188, and release bearing 190.

In some aspects, brake 108 includes pressure plate 192, cam 194, fulcrum 196, spring 198, and release bearing 200. In some aspects, assembly 172 includes pivots 202 and 204. In some aspects, levers 176 and 178 are pivotably connected to element 180, for example, by pivots 206 and 208 respectively. In some aspects, assembly 172 includes pivot points 210 and 212.

The following is a description of the operation of assembly 172. In some aspects, there are the following requirements for clutch 104 and brake 108 with respect to the operation of transmission 100: 1) torque transfer between the clutch and brake is performed without interruption, that is, both the clutch and brake are partially engaged; 2) one of the clutch or brake is engaged while the other is disengaged; and 3) both the clutch and brake are disengaged. In FIG. 4, the clutch and brake are in a neutral position and both are partially engaged. In the neutral position, levers 176 and 178 are not in contact with pivot points 210 and 212, respectively. To move the assembly from the neutral position to one of the second configurations, actuator 114 rotates shaft 118 in a first rotational direction to displace nut 180 in direction 214, causing lever 176 to pivot clockwise about point 202, which enables spring 188 to displace bearing 190 in direction 214 and pressure plate 182 in direction 216, engaging the clutch. At the same time, lever 178 rotates clockwise about point 204, further displacing bearing 200 in direction 214 and fully opening the brake. As nut 180 continues to displace in direction 214, lever 176 contacts pivot point 210 and the lever rotates clockwise about the point. The rotation about the point results in the lever displacing bearing 190 in direction 216, opening the clutch. The brake continues to remain open as bearing 200 is further displaced in direction 214.

The process is reversed as nut 180 is displaced in direction 216. To displace the nut in direction 216, actuator 114 rotates shaft 118 in an opposite rotational direction. Starting from the position in FIG. 6, as nut 180 moves in direction 216, lever 178 rotates counterclockwise about point 204, enabling spring 198 to displace bearing 200 in direction 216 and to begin to close the brake. At the same time, lever 176 rotates counterclockwise about point 202, displacing bearing 190 in direction 216, opening the clutch. As nut 180 continues to displace in direction 216, bearings 190 and 200 displace sufficiently to fully open the clutch and close the brake, respectively. As the nut traverses further in direction 216, lever 178 engages point 212 and begins to rotate counterclockwise about the point, beginning the process of opening the brake, and lever 176 continues to displace bearing 190, further opening the clutch. As the nut traverses still further in direction 216, the brake opens and the clutch remains open.

As described above, the arrangement of assembly 172 in FIG. 6 enables a smooth and uninterrupted torque transfer as clutch 104 and brake 108 are engaged and disengaged. For example, the engagement and disengagement sequences for the clutch and brake overlap so that there is no discontinuity in the torque transfer process. For example, the sequence of transitioning the clutch from a closed to an open position overlaps with the sequence of transitioning the brake from an open to a closed position. Specifically, the clutch is partially open (partially carrying torque) as the brake is partially closed (partially carrying torque). It should be understood that assembly 172 is not limited to a particular rotational direction for the first and second rotational directions noted above. For example, the first direction could be clockwise or counterclockwise with respect to an axis for the shaft. It also should be understood that assembly 172 is not limited to the configuration and components shown and that other configurations and components, which accomplish the operations described, are included in the spirit and scope of the claimed invention.

Returning to FIGS. 1 through 4, in some aspects, transmission 100 includes planetary gear set 230 and compound planetary gear set 232. Set 230 includes ring gear 234 and planetary gear carrier 236. Transmission 100 is arranged to be connected to a drive unit, for example, drive unit 238. In some aspects, unit 238 is connected to transmission 100 by flex plate 240. For example, plate 240 is connected to mass 242 for clutch 106, which is connected to cover 244 for clutch 106.

Transmission 100 includes an input arranged for connection to a drive unit, for example, flex plate 240 arranged for connection to drive unit 238. In some aspects, damper 246 is disposed between cover 244 and ring gear 234 and rotationally connects flex plate 240 and a gear set in the transmission, for example, ring gear 234 of gear set 230. Thus, an uninterrupted torque path is formed between the drive unit and the gear set, for example, gear 234. By uninterrupted, we mean that there is a continuous mechanical connection between the input and the gear set, that is, there are no elements that can be opened, such as clutches, between the input and the gear set. Thus, whenever the drive unit is transferring torque to plate 240 the torque is being transferred to the gear set, for example, gear 234. Damper 246 can be any damper known in the art. In some aspects, the damper includes one or more springs 247. Hollow shaft 248 is connected to the cover by any means known in the art, for example, spline connection 250. Thus torque from unit 238 is continuously transmitted to mass 242, pressure plate 134, cover 244, ring gear 234, and shaft 248.

Sun gear 252 of set 230 is fixed to casing 150. Carrier 236 forms the output of set 230 and is connected to shaft 256. Shaft 256 is connected to common cover 258 for clutches 102 and 104. The cover transfers torque to pressure plate 260 of clutch 102 and pressure plate 182 of clutch 104. Clutch 102 is connected to sun gear 262 of set 232 and clutch 104 is connected to sun gear 264 of set 232. Clutch 106 is connected to ring gear carrier 266 of set 232 via shaft 248. Planet gears 268 drive ring gear 270, which drives output gear 271. In some aspects, gears 270 and 271 are integral with each other. Brake 108 is arranged to ground sun gear 264 and brake 110 is arranged to ground planet carrier 266.

In some aspects, a present invention transmission includes a gear set with at least six speeds, for example, with six usable forward speeds. For a six speed configuration of the transmission, the arrangement of transmission 100 enables a reduction in the number of seals needed between portions, or chambers, of the transmission containing lubricating or cooling fluids, for example, portions 272 and 274, and portions of the transmission substantially free of fluids, for example, portions including the dry clutches and brake, for example, chamber 275 and portions 276 and 278. It should be understood that the portions free of fluids can be chambers, such as chamber 275 that are substantially fully enclosed or areas that may be partially open to an exterior of the transmission. For example, portions 276 and 278 are located at opposite axial ends of the transmission and may be partially open. Specifically, portion 276 is at least partially enclosed by the flex plate and drive unit.

In general, the transmission includes a plurality of torque transmitting members at least partially disposed in a fluid-containing chamber, such as chamber 272 or 274. The members also are at least partially disposed in portions of the transmission substantially free of fluids, for example, chamber 275, or portions 276 or 278.

In some aspects, transmission 100 is a six speed transmission as described supra and the arrangement of transmission 100 reduces the number of torque transmitting members needed to transfer torque for the six speeds. For example, only three member, or shafts, are required in the configuration of transmission 100 shown in FIGS. 1 through 3 to transfer torque for the six speeds available for transmission 100. In some aspects, the torque transmitting members are made up of three concentric shafts, for example, main shaft 248, shaft 262, and shaft 264. Seal elements, or seals, are used to provide a liquid-tight seal where the members enter or pass through partitions. As further described infra, transmission 100 advantageously requires only three sealing elements, disposed among the torque transmitting members and a partition to form a fluid-tight seal among the three torque transmitting members and the partition for a six-speed configuration. The reduced number of seals is at least partly due to the reduced number of torque transmitting members in the transmission. Fluid, or oil, communicates between portions 272 and 274 via spaces between shaft 248 and shafts 256 and 262, and channels such as channel 284.

The following is a more detailed description of a sealing arrangement for a present invention transmission. In some aspects, chamber 274 is sealed from portion 276 and chamber 275 by the following three seals: seal 286 between shaft 248 and cover 288; seal 290 between cover 244 and shaft 252; and seal 292 between shafts 252 and 256. Seal 292 is combined with bearing 294. Seal 296 with needle bearing 298 diverts oil flow to channel 284. Seal 300 is located between shafts 256 and 262, seals chamber 275, and enables oil flow from gear set 232 to gear set 230. Gear set 232, and chamber 272, are sealed portion 278 and chamber 275 by the following three seals: seal 302 (combined with bearing 304) between shafts 262 and 264; seal 306 (combined with bearing 308) between shaft 264 and housing 150, specifically, partition 282; and seal 310 between shaft 248 and housing 150, specifically partition 311. In general, seals and bearings are combined whenever possible or practical. It should be understood that a present invention transmission is not limited to the type, number, and configuration of seals shown and that other types, numbers, and configurations of seals are included within the spirit and scope of the claimed invention.

The following is a description of a bearing arrangement for a present invention transmission. In some aspects, the shafts and gears described supra are axially fixed against housing 150 by ball bearings 294, 308, 312, and 314. Shaft 248 is radially piloted against housing 150 by ball bearing 316, and over needle bearings 298 and 318, shaft 256, and ball bearing 294. Needle bearings 298 and 318 enable shaft 256 to rotate concentrically with shaft 248. Needle bearing 320 and ball bearing 314 enable shaft 262 to run concentrically with shaft 248. Ball bearing 314 also fixes shaft 262 axially. Output gear 271 and ring gear 270 are axially and radially piloted against housing 150 by bearing 312. It should be understood that a present invention transmission is not limited to the type, number, and configuration of bearings shown and that other types, numbers, and configurations of bearings are included within the spirit and scope of the claimed invention.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. An automatic transmission, comprising:
   a plurality of dry clutches comprising a first number of said clutches;
   a plurality of brakes comprising a second number of said brakes;
   a plurality of actuators; and,
   a plurality of transfer elements, wherein said transfer elements are connected to respective said clutches and brakes by respective uninterruptible mechanical paths, wherein said plurality of actuators are arranged to displace respective transfer elements from said plurality of transfer elements to operate said respective pluralities of dry clutches and brakes, wherein said plurality of actuators comprises a third number of said actuators, and wherein said third number is less than a sum of said first and second numbers.

2. The automatic transmission of claim 1 wherein said plurality of dry clutches comprises three clutches, said plurality of brakes comprises two brakes, and said plurality of actuators comprises three actuators.

3. The automatic transmission of claim 1 wherein said plurality of actuators comprises a plurality of electric actuators.

4. The automatic transmission of claim 1 wherein a first actuator from said plurality of actuators is arranged to operate a first clutch from said plurality of clutches and a first brake from said plurality of brakes and wherein a second actuator from said plurality of actuators is arranged to operate a second clutch from said plurality of clutches and a second brake from said plurality of brakes.

5. The automatic transmission of claim 4 wherein said first actuator is arranged to open one of said first clutch and said first brake and close the other of said first clutch and said first brake without overlapping in time said opening and closing.

6. The automatic transmission of claim 4 wherein said second actuator is arranged to sequentially engage and disengage said second clutch and said second brake and wherein said engagement and disengagement overlap in time to provide a continuous torque transfer.

7. The automatic transmission of claim 1 further comprising an input arranged for direct connection to a drive unit; a gear set; a damper rotationally connecting said drive unit and said gear set; and, an uninterrupted torque path between said drive unit and said gear set.

8. The automatic transmission of claim 7 wherein said gear set comprises a planetary gear set with a ring gear and wherein said damper is connected to said ring gear.

9. The automatic transmission of claim 1 further comprising:
   a chamber containing fluid;
   at least one portion substantially free of fluid;
   a gear set with at least six speeds, said gear set at least partially disposed in said chamber;
   three torque transmitting members at least partially disposed in said chamber; and,
   three sealing elements disposed among said torque transmitting members and forming a fluid-tight seal among said torque transmitting members, said chamber, and said at least one portion, and wherein said plurality of torque transmitting members is arranged to transfer torque for said at least six speeds in said gear set.

10. An automatic transmission, comprising:
    a casing;
    an input arranged for direct connection to a drive unit;
    a gear set formed separately from the casing and fully enclosed within the casing;
    a damper rotationally connecting said input and said gear set; and,
    an uninterrupted torque path between said drive unit and said gear set, wherein the gear set and the damper are located in a single sealed space sealed by liquid-tight seals and wherein said gear set comprises a planetary gear set with a ring gear and said damper is directly connected to said ring gear.

11. The automatic transmission of claim 10 further comprising:
    a plurality of dry clutches comprising a first number of said clutches;
    a plurality of brakes comprising a second number of said brakes;
    plurality of actuators; and,
    a plurality of transfer elements, wherein said transfer elements are connected to respective said clutches and brakes by respective uninterruptible mechanical paths, wherein said plurality of actuators are arranged to displace respective transfer elements from said plurality of transfer elements to operate said respective pluralities of dry clutches and brakes, wherein said plurality of actuators comprises a third number of said actuators, and wherein said third number is less than a sum of said first and second numbers.

12. The automatic transmission of claim 11 wherein said plurality of dry clutches comprises three clutches, said plurality of brakes comprises two brakes, and said plurality of actuators comprises three actuators.

13. The automatic transmission of claim 10 further comprising:
a chamber containing fluid;
at least one portion substantially free of fluid, wherein the gear set includes at least six speeds, said gear set at least partially disposed in said a chamber, the automatic transmission further comprising:
three torque transmitting members at least partially disposed in said chamber; and,
three sealing elements disposed among said torque transmitting members and forming a fluid-tight seal among said torque transmitting members, said chamber, and said at least one portion, and wherein said plurality of torque transmitting members is arranged to transfer torque for said at least six speeds in said gear set.

14. An automatic transmission, comprising:
a chamber containing fluid;
at least one portion substantially free of fluid;
a gear set with at least six speeds, said gear set at least partially disposed in said chamber;
a plurality of torque transmitting members at least partially disposed in said chamber; and,
three sealing elements disposed among said torque transmitting members and forming a fluid-tight seal among said torque transmitting members, said chamber, and said at least one portion, and wherein said plurality of torque transmitting members is arranged to transfer torque for said six speeds in said gear set.

15. The automatic transmission of claim 14 wherein said plurality of torque transmitting members comprises three concentrically disposed shafts connected to said gear set.

16. The automatic transmission of claim 15 further comprising respective pluralities of dry clutches and brakes, and wherein said at least one chamber comprises first and second chambers, said six speed gear set comprises first and second planetary gear sets located in said first and second chambers, respectively, said at least one portion comprises a third chamber axially disposed between said first and second chambers and first and second portions disposed on either axial end of said transmission, respectively, and wherein said respective pluralities of clutches and brakes are disposed in said at least one portion.

17. The automatic transmission of claim 14 further comprising:
a plurality of dry clutches comprising a first number of said clutches;
a plurality of brakes comprising a second number of said brakes;
a plurality of actuators; and,
a plurality of transfer elements, wherein said transfer elements are connected to respective said clutches and brakes by respective uninterruptible mechanical paths, wherein said plurality of actuators are arranged to displace respective transfer elements from said plurality of transfer elements to operate said respective pluralities of dry clutches and brakes, and wherein said plurality of actuators comprises a third number of said actuators less than a sum of said first and second numbers.

18. The automatic transmission of claim 17 wherein said plurality of dry clutches comprises three clutches, said plurality of brakes comprises two brakes, and said plurality of actuators comprises three actuators.

19. The automatic transmission of claim 14 further comprising an input arranged for direct connection to a drive unit; a gear set; a damper rotationally connecting said drive unit and said gear set; and, an uninterrupted torque path between said drive unit and said gear set.

20. The automatic transmission of claim 19 wherein said gear set comprises a planetary gear set with a ring gear and wherein said damper is connected to said ring gear.

21. An automatic transmission, comprising:
a first number of dry clutches;
a second number of brakes;
a third number of electric actuators;
a gear set with at least six speeds, said gear set comprising a planetary gear set with a ring gear;
an input arranged for direct connection to a drive unit;
a damper rotationally connecting said drive unit and said ring gear;
an uninterrupted torque path between said drive unit and said ring gear;
a chamber containing fluid;
at least one portion substantially free of fluid;
three torque transmitting members at least partially disposed in said chamber; and,
three sealing elements disposed among said torque transmitting members and forming a fluid-tight seal among said torque transmitting members, said chamber, and said at least one portion, wherein said transfer elements are connected to respective said clutches and brakes by respective uninterruptible mechanical paths, wherein said plurality of actuators are arranged to displace respective transfer elements from said plurality of transfer elements to operate said respective pluralities of dry clutches and brakes, wherein said third number is less than a sum of said first and second numbers, wherein said six speed gear set is at least partially disposed in said at least one chamber, and wherein said three torque transmitting members are arranged to transfer torque for said six speeds in said gear set.

* * * * *